(12) United States Patent
Goto et al.

(10) Patent No.: US 9,573,851 B2
(45) Date of Patent: Feb. 21, 2017

(54) DIELECTRIC CERAMIC COMPOSITION AND COMPOSITE CERAMIC STRUCTURE

(71) Applicant: NGK Insulators, Ltd., Nagoya (JP)

(72) Inventors: Masashi Goto, Nagoya (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/854,378

(22) Filed: Sep. 15, 2015

(65) Prior Publication Data
US 2016/0002114 A1 Jan. 7, 2016

Related U.S. Application Data

(63) Continuation of application No. PCT/JP2014/054258, filed on Feb. 24, 2014.

(30) Foreign Application Priority Data

Mar. 26, 2013 (JP) .................. 2013-063608

(51) Int. Cl.
| | |
|---|---|
| *C04B 35/49* | (2006.01) |
| *H01B 3/12* | (2006.01) |
| *C04B 35/645* | (2006.01) |
| *C04B 37/00* | (2006.01) |

(52) U.S. Cl.
CPC ............ *C04B 35/49* (2013.01); *C04B 35/645* (2013.01); *C04B 37/005* (2013.01); *H01B 3/12* (2013.01); *C04B 2235/3213* (2013.01); *C04B 2235/3215* (2013.01); *C04B 2235/3217* (2013.01); *C04B 2235/3232* (2013.01); *C04B 2235/3236* (2013.01); *C04B 2235/3248* (2013.01); *C04B 2235/3249* (2013.01); *C04B 2235/6567* (2013.01); *C04B 2235/77* (2013.01); *C04B 2235/785* (2013.01); *C04B 2235/786* (2013.01); *C04B 2235/9607* (2013.01); *C04B 2237/10* (2013.01); *C04B 2237/343* (2013.01); *C04B 2237/348* (2013.01)

(58) Field of Classification Search
CPC .................................. C04B 35/17; C04B 35/49
See application file for complete search history.

(56) References Cited

U.S. PATENT DOCUMENTS 4,938,892 A 7/1990 Toyoda et al.

FOREIGN PATENT DOCUMENTS

| | | | |
|---|---|---|---|
| JP | 63-298911 | A1 | 12/1988 |
| JP | 01-103803 | A1 | 4/1989 |
| JP | 02-124703 | A1 | 5/1990 |
| JP | 2007119275 | * | 5/2007 |
| JP | 2012-111666 | A1 | 6/2012 |
| JP | 2012-206898 | A1 | 10/2012 |

OTHER PUBLICATIONS

English Translation of International Preliminary Report on Patentability (Application No. PCT/JP2014/054258) dated Oct. 8, 2015.
Soonil Lee, et al., "*Band-Gap Nonlinearity in Perovskite Structured Solid Solutions*," Journal of Applied Physics, Jan. 15, 2010, vol. 107, Issue 2, pp. 023523-1-023523-6.
International Search Report and Written Opinion (Application No. PCT/JP2014/054258) dated May 20, 2014.

* cited by examiner

*Primary Examiner* — Karl Group
(74) *Attorney, Agent, or Firm* — Burr & Brown, PLLC

(57) ABSTRACT

Strontium titanate ($SrTiO_3$) and barium zirconate ($BaZrO_3$) are made into a solid solution at a predetermined ratio. Specifically, a dielectric ceramic composition is represented by a basic composition $(SrTiO_3)_{(1-x)}(BaZrO_3)_x$ (in the formula, X satisfies $0.63 \leq X \leq 0.95$). More preferably, X satisfies $0.67 \leq X \leq 0.90$ in this range. Such a dielectric ceramic composition may be integrated with alumina to form a composite ceramic structure.

18 Claims, 1 Drawing Sheet

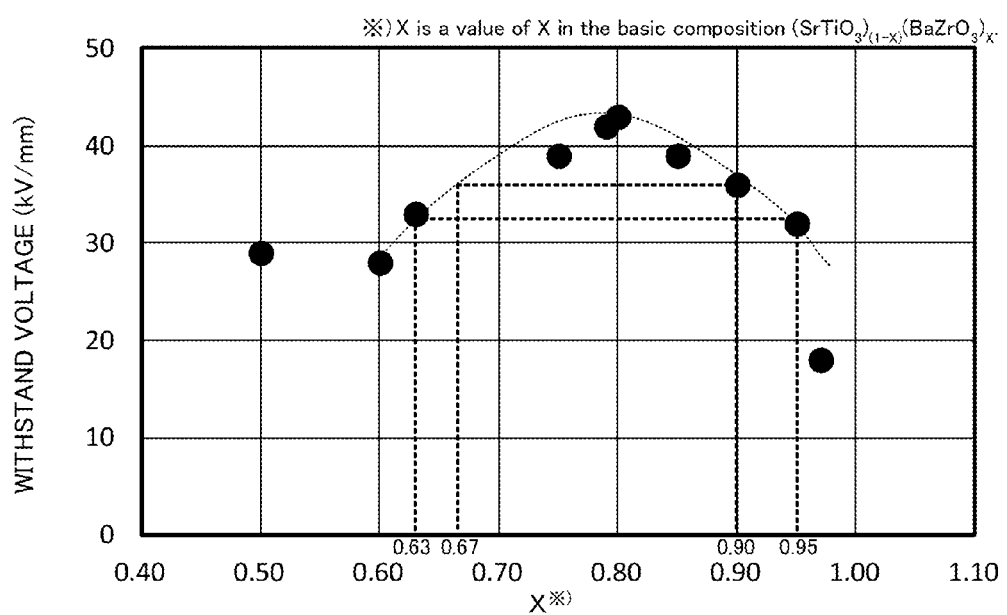

DIELECTRIC CERAMIC COMPOSITION AND COMPOSITE CERAMIC STRUCTURE

BACKGROUND OF THE INVENTION

1. Field of the Invention

The present invention relates to a dielectric ceramic composition and a composite ceramic structure.

2. Description of the Related Art

Devices by utilizing creeping discharge, e.g., a creeping discharge ozonizer, have been known previously. For example, Patent Literature 1 discloses a creeping discharge element in which a linear discharge electrode is disposed on an inside surface of alumina ceramics (insulator) formed into a cylindrical shape and a sheet-shaped induction electrode is disposed in the inside or on an outside surface thereof. Also, a creeping discharge type ozonizer which generates ozone by applying a high-frequency high voltage to such a creeping discharge element and, thereby, generating creeping discharge is disclosed.

CITATION LIST

Patent Literature

PTL 1: JP 2012-111666 A

SUMMARY OF THE INVENTION

Meanwhile, as for the device by utilizing such creeping discharge, use of various materials other than alumina has been studied. Creeping discharge is generated by applying a high-frequency high voltage. Therefore, an insulator between the discharge electrode and the induction electrode has been desired to have a high withstand voltage which can endure dielectric breakdown.

The present invention has been made to solve the above-described problems, and a main object is to provide a material having a high withstand voltage.

The present inventors conducted intensive research to achieve the above-described main object. As a result, it was found that in the case where strontium titanate ($SrTiO_3$) and barium zirconate ($BaZrO_3$) were made into a solid solution at a predetermined ratio, the withstand voltage was able to be increased as compared with the case where they were used independently, and the present invention has been completed.

That is, a dielectric ceramic composition according to the present invention is represented by a basic composition $(SrTiO_3)_{(1-x)}(BaZrO_3)_x$ (in the formula, X satisfies $0.63 \leq X \leq 0.95$).

According to the dielectric ceramic composition of the present invention, a material having a high withstand voltage can be provided. Although the reasons such effects are obtained are not certain, it is estimated that the crystal grain sizes of the fired body become small and uniform by formation of solid solution of strontium titanate and barium zirconate at an appropriate ratio.

In the composite ceramic structure according to the present invention, the above-described dielectric ceramic composition and alumina are integrated.

In the composite ceramic structure according to the present invention, a difference in thermal expansion coefficient between the above-described dielectric ceramic composition and alumina is small, so that even when a temperature change is applied, cracking and the like resulting from the difference in the thermal expansion coefficient do not occur easily.

BRIEF DESCRIPTION OF DRAWINGS

FIG. 1 is a graph showing the relationship between the value of X and the withstand voltage.

DESCRIPTION OF THE PREFERRED EMBODIMENTS

[Dielectric Ceramic Composition]

A dielectric ceramic composition according to the present invention is represented by a basic composition $(SrTiO_3)_{(1-x)}(BaZrO_3)_x$ and is preferably a solid solution of $SrTiO_3$ and $BaZrO_3$. In the formula, X satisfies $0.63 \leq X \leq 0.95$. Such materials can obtain high withstand voltages of, for example, 30 kV/mm or more. Among them, the lower limit value of X is preferably 0.67, and more preferably 0.75. The upper limit value is preferably 0.90, and more preferably 0.85. This is because the withstand voltage can be further increased in such a range.

The dielectric ceramic composition has an average crystal grain size of preferably 4 μm or less, and more preferably 1.9 μm or less. This is because the withstand voltage of such a material can be increased. Here, the average crystal grain size is specified to be a value determined as described below. Initially, any surface of the dielectric ceramic composition is polished, the polished surface is observed with a scanning electron microscope (SEM) to obtain a SEM image. Subsequently, a straight line is drawn on the resulting SEM image, and the number of crystals on the straight line is counted. Then, a value obtained by dividing the length of the straight line by the number of crystals is specified to be the average crystal grain size.

The dielectric ceramic composition has a relative density of preferably 97% or more, and more preferably 98% or more. This is because such a material is sufficiently dense and, therefore, the withstand voltage can be increased.

The withstand voltage of the dielectric ceramic composition is preferably 30 kV/mm or more, and more preferably 39 kV/mm or more. The reason is that a higher withstand voltage is preferable because dielectric breakdown of the dielectric ceramic composition can be suppressed. Also, the lower limit value of the relative dielectric constant of the dielectric ceramic composition is preferably 44, and more preferably 69. The upper limit value is preferably 180, and more preferably 120. This is because the compatibility between a high relative dielectric constant and a high withstand voltage can be ensured in such a range. Meanwhile, the lower limit value of the thermal expansion coefficient of the dielectric ceramic composition is preferably 7.7 ppm/K, and more preferably 8.0 ppm/K. The upper limit value is preferably 9.0 ppm/K, and more preferably 8.8 ppm/K. This is because the thermal expansion coefficient is close to the thermal expansion coefficient of alumina, so that integration with alumina is facilitated, and a high withstand voltage is obtained in such a range.

The dielectric ceramic composition may be produced through, for example, (a) a raw material mixing step, (b) a forming step, and (c) a firing step.

(a) Raw Material Mixing Step

In the raw material mixing step, a mixed raw material is obtained by mixing a Sr source, a Ti source, a Ba source and a Zr source in such a way that a predetermined ratio in the basic composition $(SrTiO_3)_{(1-x)}(BaZrO_3)_x$ (in the formula, X satisfies 0.63≤X≤0.95) is ensured. The Sr source, the Ti source, the Ba source and the Zr source are not specifically limited and may be metal simple substances, alloys containing at least one of them, or oxides, hydroxides, carbonates, nitrates, sulfates, and the like containing at least one of them. Most of all, it is preferable that $SrTiO_3$ be used as the Sr source and the Ti source and $BaZrO_3$ be used as the Ba source and the Zr source because the dielectric ceramic composition represented by the basic composition $(SrTiO_3)_{(1-x)}(BaZrO_3)_x$ can be obtained relatively easily. The mixing method is not specifically limited and may be dry mixing or be wet mixing in the presence of a solvent. At this time, it is preferable to perform milling and mixing by using a mortar, ball mill, or the like. This is because the raw materials are mixed more homogeneously, so that a dielectric ceramic composition in which the whole microstructure is homogeneous is obtained.

(b) Forming Step

In the forming step, the mixed raw material obtained in the raw material mixing step is formed into a predetermined shape to obtain a compact. Examples of forming methods include uniaxial press, isostatic press, extrusion, and injection forming.

(c) Firing Step

In the firing step, the compact obtained in the forming step is fired so as to be densified. The firing atmosphere may be an oxidizing atmosphere, a reducing atmosphere, an inert atmosphere, or a reduced pressure atmosphere, although the oxidizing atmosphere is preferable from the viewpoint of production of a metal composite oxide. Examples of oxidizing atmospheres include an air atmosphere and an oxygen atmosphere. The firing temperature is preferably 1,400° C. or higher and 1,600° C. or lower. In the case of 1,400° C. or higher, densification proceeds sufficiently and the relative density increases, so that the withstand voltage and the relative dielectric constant of the dielectric ceramic composition can be further increased. Also, in the case of 1,600° C. or lower, crystal grains do not become too large, so that the withstand voltage can be further increased. In this regard, pressurization may be performed in the firing.

As for the above-described dielectric ceramic composition according to the present invention, the withstand voltage can be increased. Although the reasons such effects are obtained are not certain, it is estimated that the crystal grain sizes of the fired body become small and uniform by formation of solid solution of strontium titanate and barium zirconate at an appropriate ratio.

Also, this dielectric ceramic composition has a relatively high relative dielectric constant. Consequently, the discharge start voltage of the creeping discharge can be decreased and the power consumption can be reduced.

In addition, this dielectric ceramic composition has a thermal expansion coefficient close to that of alumina. In the case where this dielectric ceramic composition and alumina are integrated, a difference in the thermal expansion coefficient between the two is small. Therefore, cracking and the like resulting from the difference in the thermal expansion coefficient do not occur easily even in the case where a temperature change is applied, so that high bonding strength is obtained.

In addition, this dielectric ceramic composition is densified at relatively low temperatures of, for example, 1,600° C. or lower. Therefore, production is easily performed.

[Composite Ceramic Structure]

The ceramic structure according to the present invention is produced by integrating the above-described dielectric ceramic composition and alumina $(Al_2O_3)$. The method for integration is not specifically limited. The dielectric ceramic composition and the alumina may be directly bonded or be bonded with a bonding agent therebetween.

Examples of methods for direct bonding include a method in which a dielectric ceramic composition before firing and alumina before firing are bonded through co-firing. Specifically, for example, an integrated compact may be produced by bringing a compact of dielectric ceramic composition before firing into contact with an alumina compact before firing in the above-described "(b) Firing step" and bonding may be performed by firing the integrated compact in "(c) Firing step". The temperature of 1,400° C. or higher and 1,600° C. or lower suitable for firing of the dielectric ceramic composition is also suitable for firing of the alumina and bonding of the dielectric ceramic composition and the alumina. Therefore, integration can be performed through co-firing.

Examples of methods for bonding through the bonding agent include a method in which the bonding agent is placed on a bonding surface between the dielectric ceramic composition after firing and the alumina after firing and the bonding agent is softened or melted by heating at least the periphery of the bonding agent to perform bonding. It is preferable that a difference in the thermal expansion coefficient of the bonding agent and those of the dielectric ceramic composition and the alumina be small. This is because cracking and the like resulting from the difference in the thermal expansion coefficient between the bonding agent and the dielectric ceramic composition or the alumina do not occur easily even in the case where a temperature change is applied. Also, it is preferable that bonding be possible at temperatures lower than or equal to the firing temperatures of the dielectric ceramic composition and the alumina. As for such a bonding agent, glass frit, glass paste, and the like can be favorably used.

In the above-described composite ceramic structure according to the present invention, a difference in the thermal expansion coefficient between the above-described dielectric ceramic composition and the alumina is small and, therefore, cracking and the like resulting from the difference in the thermal expansion coefficient do not occur easily even in the case where a temperature change is applied. Meanwhile, as for such a composite ceramic structure, high efficiency creeping discharge can be performed in the portion of the dielectric ceramic composition while a high insulating property is maintained in the portion of the alumina because of integration with the alumina exhibiting a high insulating property.

In this regard, the present invention is not limited to the above-described embodiments and can be executed in various forms within the technical scope of the present invention, as a matter of course.

EXAMPLES

The specific examples of production of the dielectric ceramic composition will be described below as experimental examples. In this regard, Experimental examples 3 to 9 correspond to examples of the present invention, and Experimental examples 1, 2 and 10 correspond to the comparative examples.

[Production of Dielectric Ceramic Composition (Fired Body)]

Strontium titanate ($SrTiO_3$, produced by Fuji Titanium Industry Co., Ltd., purity ≥97%) and barium zirconate ($BaZrO_3$, produced by Kojundo Chemical Laboratory Co., Ltd., purity ≥98%) were prepared as raw materials. The prepared strontium titanate and barium zirconate were weighed and mixed at the molar ratio shown in Table 1 to obtain a mixed raw material. Subsequently, the mixed raw material was added to isopropyl alcohol (IPA) serving as a solvent, and wet mixing was performed with a ball mill by utilizing $ZrO_2$ cobble stones having a diameter of 10 mm. The resulting powder was passed through a #100 sieve and was dried for a night with a nitrogen drier. A compact was obtained by molding 100 g of the thus obtained dried powder into the shape having a diameter of 65 mm at a pressing pressure of 100 kg/cm². The resulting compact was further subjected to a CIP treatment (isostatic pressing treatment) under the condition of the pressing pressure of 3,000 kg/cm² for 30 seconds. Finally, firing was performed in the air atmosphere at 1,500° C. for 2 hours, so that fired bodies of Experimental examples 1 to 10 were obtained.

[Derivation of Relative Density]

The bulk density of each fired body was measured by the Archimedes' method, where a medium was pure water, in conformity with JIS-R1634. Also, the pulverized sample obtained by pulverizing each fired body with a mortar was used and the true density of each fired body was measured with a dry automatic densimeter (AccuPyc 1330 produced by Micrometrics). The relative density was derived by dividing the measured bulk density by the measured true density.

[Derivation of Average Crystal Grain Size]

Initially, the surface of each fired body was polished. Subsequently, the polished surface was observed with a scanning electron microscope (SEM) and a SEM image was obtained. A straight line was drawn on the resulting image, the number of crystals on the straight line was counted, the length of the straight line was divided by the number of crystals and, thereby, the average crystal grain size was derived. In this regard, the SEM observation was performed by using XL30 produced by Philips under the condition of the acceleration voltage of 20 kV, the spot size of 4.0, and the magnification of 10,000 times. The number of view fields observed was arbitrarily selected five view fields per fired body.

[Measurement of Thermal Expansion Coefficient]

Initially, a rectangular test piece of 3×3×20 mm was cut from each fired body. Subsequently, the test piece was set into a vertical thermal dilatometer (Thermo plus EVO TMA8310, produced by Rigaku Corporation) and the thermal expansion coefficient was measured. The measurement was performed in a rage of 40° C. or higher and 1,000° C. or lower, where the reference substance was specified to be alumina and the temperature was raised at 10° C./min. The thermal expansion coefficient was specified to be the value at 1,000° C., where the reference temperature was specified to be 40° C.

[Measurement of Relative Dielectric Constant]

Initially, a disk-shaped test piece of 50 mmφ×1 mm was cut from each fired body. Subsequently, the measurement was performed in conformity with JIS-C2141 by using an impedance analyzer (6440B, produced by Wayne Kerr Electronics).

[Measurement of Withstand Voltage]

Initially, a test piece, which was a disk of 50 mmφ×10 mm with a surface provided with a dent of 10 mmφ, was cut from each fired body. Subsequently, the withstand voltage was measured in conformity with the international standard IEC60672-2. In this regard, the test piece after the measurement of the withstand voltage had a hole due to dielectric breakdown.

[Evaluation of Presence or Absence of Crack in Bonding with Alumina]

Initially, a rectangular test piece of 10×10×1 mm was cut from each fired body. Also, an alumina dense body was prepared and was cut into a rectangular shape of 10×10×1 mm. The two were bonded together with glass frit (thermal expansion coefficient 8 ppm/K) therebetween, and firing was performed in the air atmosphere at 950° C. for 2 hours. After the firing, whether a crack was present in the glass layer or the bonding interface between the glass layer and the test piece or not was examined with an optical microscope.

EXPERIMENTAL RESULT

Table 1 shows the composition, the relative density, the average crystal grain size, the thermal expansion coefficient,

TABLE 1

| | Composition (molar ratio) | | Relative Density % | Average crystal grain size μm | Thermal Expansion Coefficient ppm/K | Relative Dielectric Constant — | Withstand Voltage kV/mm | Presence or Absence of Crack in Bonding |
|---|---|---|---|---|---|---|---|---|
| | $SrTiO_3$ (1 − X) | $BaZrO_3$ (X) | | | | | | |
| Experimental Example 1 | 0.50 | 0.50 | 97.7 | 9.2 | 9.6 | 250 | 29 | Presence |
| Experimental Example 2 | 0.40 | 0.60 | 97.9 | 5.4 | 9.3 | 190 | 28 | Presence |
| Experimental Example 3 | 0.37 | 0.63 | 98.1 | 4.0 | 9.0 | 180 | 33 | Absence |
| Experimental Example 4 | 0.25 | 0.75 | 98.2 | 1.9 | 8.8 | 120 | 39 | Absence |
| Experimental Example 5 | 0.21 | 0.79 | 98.5 | 1.8 | 8.5 | 96 | 42 | Absence |
| Experimental Example 6 | 0.20 | 0.80 | 98.7 | 0.8 | 8.5 | 94 | 43 | Absence |
| Experimental Example 7 | 0.15 | 0.85 | 98.0 | 0.6 | 8.0 | 69 | 39 | Absence |
| Experimental Example 8 | 0.10 | 0.90 | 97.7 | 0.5 | 8.0 | 54 | 36 | Absence |
| Experimental Example 9 | 0.05 | 0.95 | 97.2 | 0.4 | 7.7 | 44 | 32 | Absence |
| Experimental Example 10 | 0.03 | 0.97 | 83.1 | 0.3 | 7.6 | 40 | 18 | Absence | the relative dielectric constant, the withstand voltage, and presence or absence of crack in bonding of each of Experimental examples 1 to 10. FIG. 1 shows the relationship between the value of X and the withstand voltage. As is clear from Table 1 and FIG. 1, in the case where X in the basic composition $(SrTiO_3)_{(1-x)}(BaZrO_3)_x$ satisfied $0.63 \leq X \leq 0.95$, a high withstand voltage of more than 30 kV/mm was obtained. It was found that, among them, those satisfying $0.67 \leq X \leq 0.90$ were preferable because the withstand voltages were 36 kV/mm or more and those satisfying $0.75 \leq X \leq 0.85$ were more preferable because the withstand voltage were 39 kV/mm or more.

In all the cases where X satisfied $X \leq 0.95$, the relative densities were large values of 97.2% or more. Consequently, it was found that in the examples according to the present invention satisfying $X \leq 0.95$, sufficient densification occurred even when firing was performed at a relatively low temperature of 1,500° C.

The average crystal grain size became smaller as the value of X increased. Here, it is considered that as the average crystal grain size becomes small, there are tendencies of variations in the crystal grain sizes to decrease and the withstand voltage to increase. However, in Experimental example 10 in which the average crystal grain size was the smallest and was 0.3 μm, the withstand voltage was low and was 18 kV/mm. The reason for this was considered that in Experimental example 10, densification was not sufficient, many pores were present and, thereby, pores and dielectric interfaces on which the electric field was concentrated increased. Consequently, it was estimated that in the example in which X satisfied $0.63 \leq X \leq 0.95$, a high withstand voltage was exhibited because the crystal grain sizes were small and uniform.

The thermal expansion coefficient decreased as the value of X increased. It was found that among them, the thermal expansion coefficient within the range of 7.7 ppm/K or more and 9.0 ppm/K or less was preferable because the compatibility with a high withstand voltage was able to be ensured. Also, it was found that the thermal expansion coefficient within such a range was the value close to the thermal expansion coefficient of alumina and was preferable because cracking and the like resulting from a difference in the thermal expansion coefficient did not occur easily in the case of use based on integration with the alumina. This was ascertained from the evaluation of presence or absence of crack in bonding with alumina, where cracking occurred in those having a thermal expansion coefficient of larger than 9.0 ppm/K, although cracking did not occur in those having a thermal expansion coefficient of 7.6 ppm/K or more and 9.0 ppm/K or less.

The relative dielectric constant decreased as the value of X increased. It was found that among them, the relative dielectric constant within the range of 44 or more and 180 or less was preferable because the compatibility between a high relative dielectric constant and a high withstand voltage was able to be ensured.

The present invention claims priority to Japanese Patent Application No. 2013-063608, filed in the Japan Patent Office on Mar. 26, 2013, the entire contents of which are incorporated herein by reference.

INDUSTRIAL APPLICABILITY

The present invention can be utilized in, for example, the technical field in which devices by utilizing creeping discharge are produced.

What is claimed is:

1. A dielectric ceramic represented by a basic composition $(SrTiO_3)_{(1-x)}(BaZrO_3)_x$, wherein X satisfies $0.63 \leq X \leq 0.95$, and said dielectric ceramic has an average crystal grain size of 4 μm or less.

2. The dielectric ceramic according to claim 1, wherein said dielectric ceramic is a solid solution of $SrTiO_3$ and $BaZrO_3$.

3. The dielectric ceramic according to claim 1, wherein X satisfies $0.67 \leq X \leq 0.90$.

4. The dielectric ceramic according to claim 1, wherein said dielectric ceramic has a withstand voltage of 30 kV/mm or more.

5. The dielectric ceramic according to claim 1, wherein said dielectric ceramic has a thermal expansion coefficient of 7.7 ppm/K or more and 9.0 ppm/K or less.

6. A composite ceramic structure comprising the dielectric ceramic according to claim 1 integrated with alumina.

7. A dielectric ceramic represented by a basic composition $(SrTiO_3)_{(1-x)}(BaZrO_3)_x$, wherein X satisfies $0.63 \leq X \leq 0.95$, and said dielectric ceramic has a relative density of 97% or more.

8. The dielectric ceramic according to claim 7, wherein said dielectric ceramic is a solid solution of $SrTiO_3$ and $BaZrO_3$.

9. The dielectric ceramic according to claim 7, wherein X satisfies $0.67 \leq X \leq 0.90$.

10. The dielectric ceramic according to claim 7, wherein said dielectric ceramic has a withstand voltage of 30 kV/mm or more.

11. The dielectric ceramic according to claim 7, wherein said dielectric ceramic has a thermal expansion coefficient of 7.7 ppm/K or more and 9.0 ppm/K or less.

12. A composite ceramic structure comprising the dielectric ceramic according to claim 7 integrated with alumina.

13. A dielectric ceramic represented by a basic composition $(SrTiO_3)_{(1-x)}(BaZrO_3)_x$, wherein X satisfies $0.63 \leq X \leq 0.95$, and said dielectric ceramic has a relative dielectric constant of 44 or more and 180 or less.

14. The dielectric ceramic according to claim 13, wherein said dielectric ceramic is a solid solution of $SrTiO_3$ and $BaZrO_3$.

15. The dielectric ceramic according to claim 13, wherein X satisfies $0.67 \leq X \leq 0.90$.

16. The dielectric ceramic according to claim 13, wherein said dielectric ceramic has a withstand voltage of 30 kV/mm or more.

17. The dielectric ceramic according to claim 13, wherein said dielectric ceramic has a thermal expansion coefficient of 7.7 ppm/K or more and 9.0 ppm/K or less.

18. A composite ceramic structure comprising the dielectric ceramic according to claim 13 integrated with alumina.

* * * * *